United States Patent
Bovyrin et al.

(10) Patent No.: US 10,909,394 B2
(45) Date of Patent: Feb. 2, 2021

(54) REAL-TIME MULTIPLE VEHICLE DETECTION AND TRACKING

(71) Applicant: Intel Corporation, Santa Clara, CA (US)

(72) Inventors: Alexander Bovyrin, Nizhny Novgorod (RU); Alexander Suslov, Balakhna (RU); Grigory Serebryakov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 15/752,597

(22) PCT Filed: Sep. 8, 2016

(86) PCT No.: PCT/US2016/050653
§ 371 (c)(1),
(2) Date: Feb. 14, 2018

(87) PCT Pub. No.: WO2017/044550
PCT Pub. Date: Mar. 16, 2017

(65) Prior Publication Data
US 2018/0239973 A1    Aug. 23, 2018

Related U.S. Application Data

(60) Provisional application No. 62/217,145, filed on Sep. 11, 2015.

(51) Int. Cl.
*G06K 9/00* (2006.01)
*G06T 7/70* (2017.01)

(52) U.S. Cl.
CPC ..... *G06K 9/00825* (2013.01); *G06K 9/00805* (2013.01); *G06T 7/70* (2017.01); *G06T 2207/30261* (2013.01)

(58) Field of Classification Search
None
See application file for complete search history.

(56) References Cited

U.S. PATENT DOCUMENTS

2005/0249401 A1    11/2005 Bahlmann et al.
2012/0170805 A1     7/2012 Brown et al.
(Continued)

FOREIGN PATENT DOCUMENTS

JP    2010517139 A    5/2010

OTHER PUBLICATIONS

PCT Search Report and Written Opinion dated Nov. 28, 2016 in corresponding PCT/US2016/050653 (10 pages).

*Primary Examiner* — Justin P. Misleh
(74) *Attorney, Agent, or Firm* — Trop, Pruner & Hu, P.C.

(57) ABSTRACT

A tracking algorithm includes a tracking failure detection technique using a key points selection algorithm. As a result, the described system is able to work on an embedded device in real time, providing high quality vehicle detection and tracking, in some embodiments. A vision system detects and tracks vehicles from sequences of images taken from another moving vehicle in real-time on an embedded platform. The system can achieve real-time performance on an embedded platform in some embodiments, taking into account that modern boosting detectors are too slow for use in such a system. A tracker includes an algorithm for tracking and an algorithm for detection of tracking failures. The tracking algorithm is based on an optical flow calculation for key points selected based on the distribution of features from the last detection. The algorithm for detection of tracking failures is based on an estimation of low confidence detections.

24 Claims, 5 Drawing Sheets

(56) References Cited

U.S. PATENT DOCUMENTS

| | | |
|---|---|---|
| 2014/0185925 A1 | 7/2014 | Datta et al. |
| 2014/0270367 A1 | 9/2014 | Wang et al. |
| 2016/0063727 A1* | 3/2016 | Gao .................. G06K 9/00335 382/103 |
| 2016/0267325 A1* | 9/2016 | Sundaresan ........ G06K 9/00624 |
| 2017/0053167 A1* | 2/2017 | Ren .................... G06K 9/00624 |

* cited by examiner

REAL-TIME MULTIPLE VEHICLE DETECTION AND TRACKING

CROSS-REFERENCE TO RELATED APPLICATION

This application is a non-provisional application claiming priority to U.S. provisional application Ser. No. 62/217,145 filed on Sep. 11, 2015.

BACKGROUND

The task of detection and tracking vehicles is one of the core modules of many different safety features of advanced driver assistance systems (ADAS) such as forward collision warning (FCW) systems, drive monitoring systems, adaptive cruise control (ACC) and others. Performance and quality of these systems are largely dependent on the speed and accuracy of vehicles' detection and tracking. Due to low power consumption in embedded platforms, ADAS systems need to run in real-time and the vehicle detection and tracking subsystem, as one of the core modules, needs to run very fast. There are many detection algorithms, but they slow down real-time systems on embedded platforms.

BRIEF DESCRIPTION OF THE DRAWINGS

Some embodiments are described with respect to the following figures.

DETAILED DESCRIPTION

A tracking algorithm provides a low number of failures during tracking due to a failures detection technique and tracking procedure using a key points selection algorithm according to one embodiment. As a result, the described system is able to work on an embedded device in real time, providing high quality vehicle detection and tracking, in some embodiments.

A vision system detects and tracks vehicles from sequences of images taken from another moving vehicle in real-time on an embedded platform. The system can achieve real-time performance on an embedded platform in some embodiments, taking into account that modern boosting detectors are too slow for use in such a system. A tracker includes an algorithm for tracking and an algorithm for detection of tracking failures. The tracking algorithm is based on an optical flow calculation for key points selected based on the distribution of features from the last detection. Only key points that are important for vehicle detection are selected. The algorithm for detection of tracking failures is based on an estimation of lower confidence detections. The tracker may be very fast due to reuse of calculated data during detection. Even a slow detector may be used to produce image processing in real-time on an embedded platform without loss of quality of detection and tracking in some embodiments.

Powerful statistical detectors that are used for vehicle detection can run more slowly than real-time on embedded platforms. Thus, the detector called the main detector is run in a background thread. A tracking method gets vehicles' coordinates from an image between main detector results. The system can run in two threads. One thread is for the main detector and another thread is for tracking.

Figure 1:
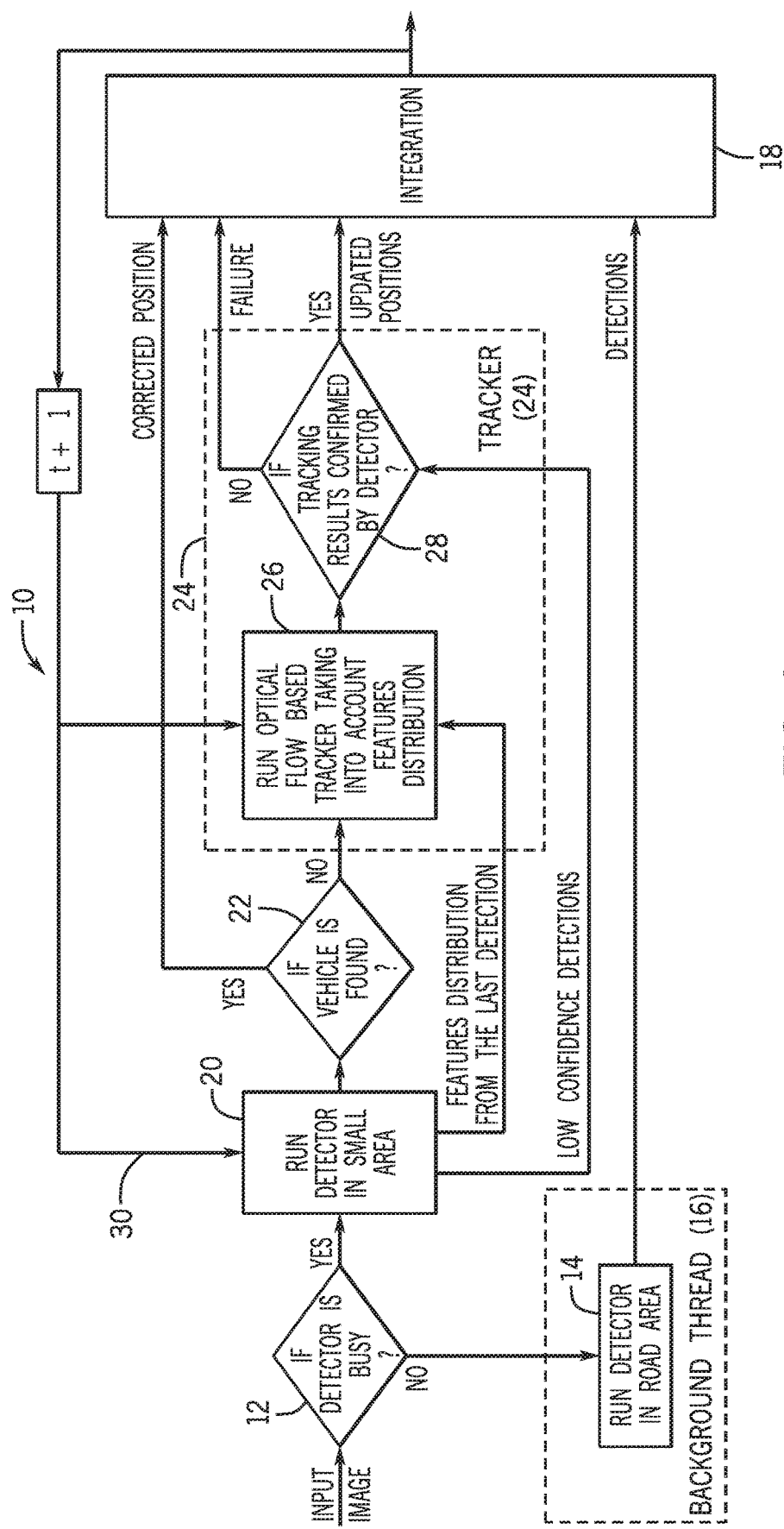
FIG. 1 is a schematic description of an apparatus for detection and tracking of vehicles according to one embodiment.

In the FIG. 1, a vehicle detection and tracking statistical structure and data flow 10 are illustrated. An input image is processed by the main detector 14, running as a background thread 16 if the main detector is not busy as determined based on calculations with a previous frame, as determined at diamond 12. The detection results from the background thread are sent to the integration module 18. The main detector may be a statistical detector.

Figure 2:
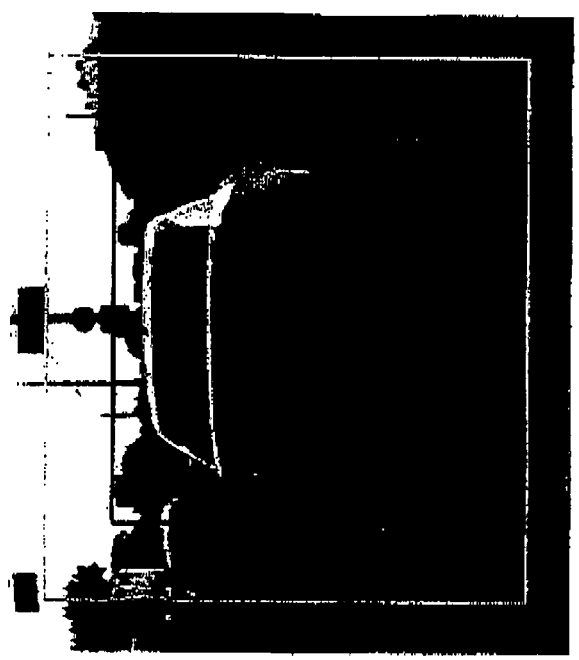
FIG. 2 shows the small area where the detector runs if the main detector is busy, and a bounding box of the vehicle from the previous image according to one embodiment.

If the main detector is busy (diamond 12) processing of previous frame, a small area A (FIG. 2) around a previously detected bounding box of vehicle (say 1.5 times greater than previously found bounding box of the vehicle in the image) is considered and the same statistical detector 14 is run in this area as determined in block 20. This is faster than running the main detector over the whole image and it can be done in real-time. The boosting-family detector allows us to get higher confidence results as well as lower confidence results. Lower confidence detections are sent to diamond 28. A features distribution from the last detection is sent to block 26. A boosting family detector is described in P. Viola, M. Jones: Robust Real-time Object Detector, IJCV, 2004.

Statistical detector for each image rectangle returns a higher or lower confidence value indicating one of two levels of confidence that this rectangle is a vehicle. If the statistical detector finds the vehicle in this area A (diamond 22) as a higher confidence result, the vehicle's bounding box B is inserted, as a corrected position, from the previous image into the integration module 18 that performs integration of main detector results and tracking results.

If the vehicle is not found in this area A with higher confidence, an optical flow is run (block 26) in the tracker 24 using the features distribution to estimate vehicle position in case of detector failure. An optical flow is a pattern of apparent motion of an object, in this case a vehicle, in a visual scene caused by relative motion between the camera and the scene. The optical flow based tracking is described below.

The optical flow tracking result is verified using lower confidence results from the statistical detector at diamond 28. If the optical flow result is confirmed, updated positions are sent to the integration module 18. Otherwise (NO), the failure indication is sent to the integration module 18.

The integration module 18 performs integration of all results from the main detector, from the detector in the small area and from the tracker 24. The results from the detector in the small area and from the tracker that are confirmed by the detector, are valid in the current image. They are the inputs 30 to the detector in the small area and the tracker for the next image. The results from the tracker which are not confirmed ("failure") by the detector are removed by the integration module.

The results from the main detector 14 are not valid in the current image, because the main detector 14 runs more slowly than the main pipeline 20-28 and returns results with delay in k frames, where k depends on the performance of a detector 14. These results go to the small area detector in the small area, assuming detected vehicles have not moved far during k frames. If the small area detector detects a vehicle with high confidence, then the vehicle is added on tracking (Yes, output of diamond 28).

The tracker 24 includes two steps: updating the bounding box of vehicle using the tracking algorithm and verifying the tracking results. The tracker runs in a different thread than the main detector 14.

Figure 3:
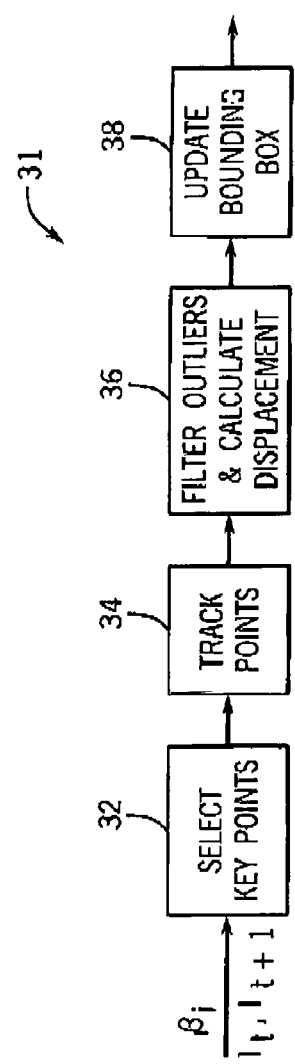
FIG. 3 schematically shows the structure of a tracking algorithm according to one embodiment.

The tracking algorithm updates bounding box $\beta_i$ of i-th vehicle taking into account the optical flow between sequential images ($l_t$, $l_{t+1}$). A block schematic of the tracking algorithm 31 is shown in FIG. 3. A set of points that define where to calculate a sparse optical flow is initialized (block 32) by the points selection algorithm described below. Then the optical flow in the set of points is calculated independently using a sparse optical flow algorithm (block 34). Sparse optical flow can be calculated by Lucas-Kanade method for example. Next, the average displacement of the points is calculated and outliers, whose optical flows are not correlated with average optical flow vector, are filtered out (block 36). This procedure is repeated iteratively until the number of filtered points reaches some minimal value and the standard deviation of point displacements reaches some minimal value. The result of this procedure is the bounding box of the new vehicle position (block 38).

A scale change of bounding box of vehicle is calculated as follows. For each pair of filtered points, a ratio between distances, calculated between points on image $l_t$ and between points on image $l_{(t+1)}$ is calculated. A scale change is defined as the median over these ratios. Then the updated bounding box of vehicle is verified using the tracking failures detection algorithm which is described below. This verification is used to avoid tracking of a rectangle that is not similar at all to a vehicle.

Figure 4A:
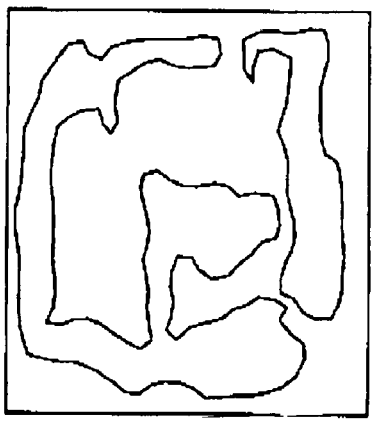
FIG. 4A shows the feature distribution of the trained model for the boosting-family detector according to one embodiment.
Figure 4B:
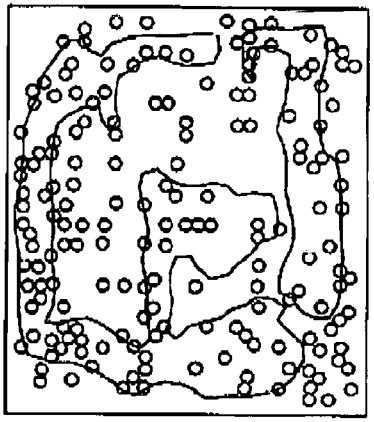
FIG. 4B shows potential key points or points with maximal feature density.
Figure 4C:
FIG. 4C shows selected key points with feature distribution value more than a defined threshold and thresholded feature distribution map for some embodiments.

Key points are selected based on data from a statistical boosting-family detector 20. The key points are selected according to the feature distribution in the bounding box of the vehicle. During classification process, the statistical detector calculates features (for instance Local Binary Pattern (LBP) features) in rectangular sub-regions. For each vehicle pixel one can calculate a number of such sub-regions that are explored during classification. This number is stored for each pixel in the auxiliary feature distribution map. The feature distribution map is built only on the vehicle sub-regions that were active during last classification. It is illustrated in FIG. 4c.

Figure 5:
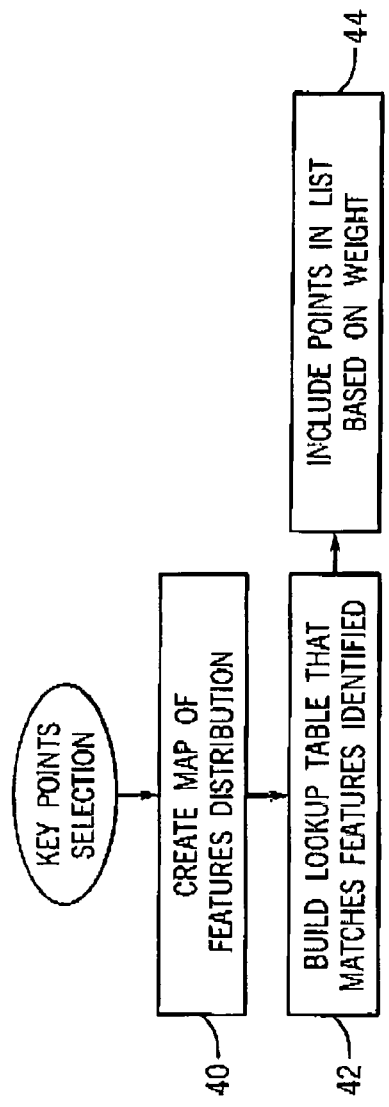
FIG. 5 is a flow chart for one embodiment.

A fast method for key points selection is shown in FIG. 5. In the preprocess step 40, done once at the system initialization, create a map of the feature distribution of the trained model for the boosting-family detector. Each pixel value of this auxiliary map indicates how many times this pixel was used to calculate some features used in classification. In discriminative vehicle parts (like wheels), one pixel can be used to calculate different LBP features. The number of LBP features calculated in this pixel reflects the importance of this pixel for the vehicle/not-vehicle classification. To create this map, consider all features and each feature increases by one, the value of pixels belonging to the rectangle of this feature (FIG. 4A). Then build a look-up table (block 42) that matches the feature identifier with the list of points that corresponded to local maximums in the feature distribution map. A point is included in the list taking into account its weight (map value) (block 44). The size of the list is a parameter of the algorithm.

During the key points selection stage of the tracking algorithm, identifiers of the active features from the last detection are available. According to the method of look-up table building, all potential key points (FIG. 4B) are known. Calculate weights for these points using a look-up table. Then select a predefined number of key points with maximum weights (FIG. 4C).

With respect to detection of a tracking failure, for confirmation, the tracked bounding box should be similar enough with at least one of the lower confidence results from the last detection. Then a ratio of intersection area of lower confidence bounding box and tracked bounding box to the area of tracked bounding box is checked. The tracking result is rejected in the case where a lower confidence result confirming a tracking result with a ratio less than a predefined threshold is not found.

Figure 6:
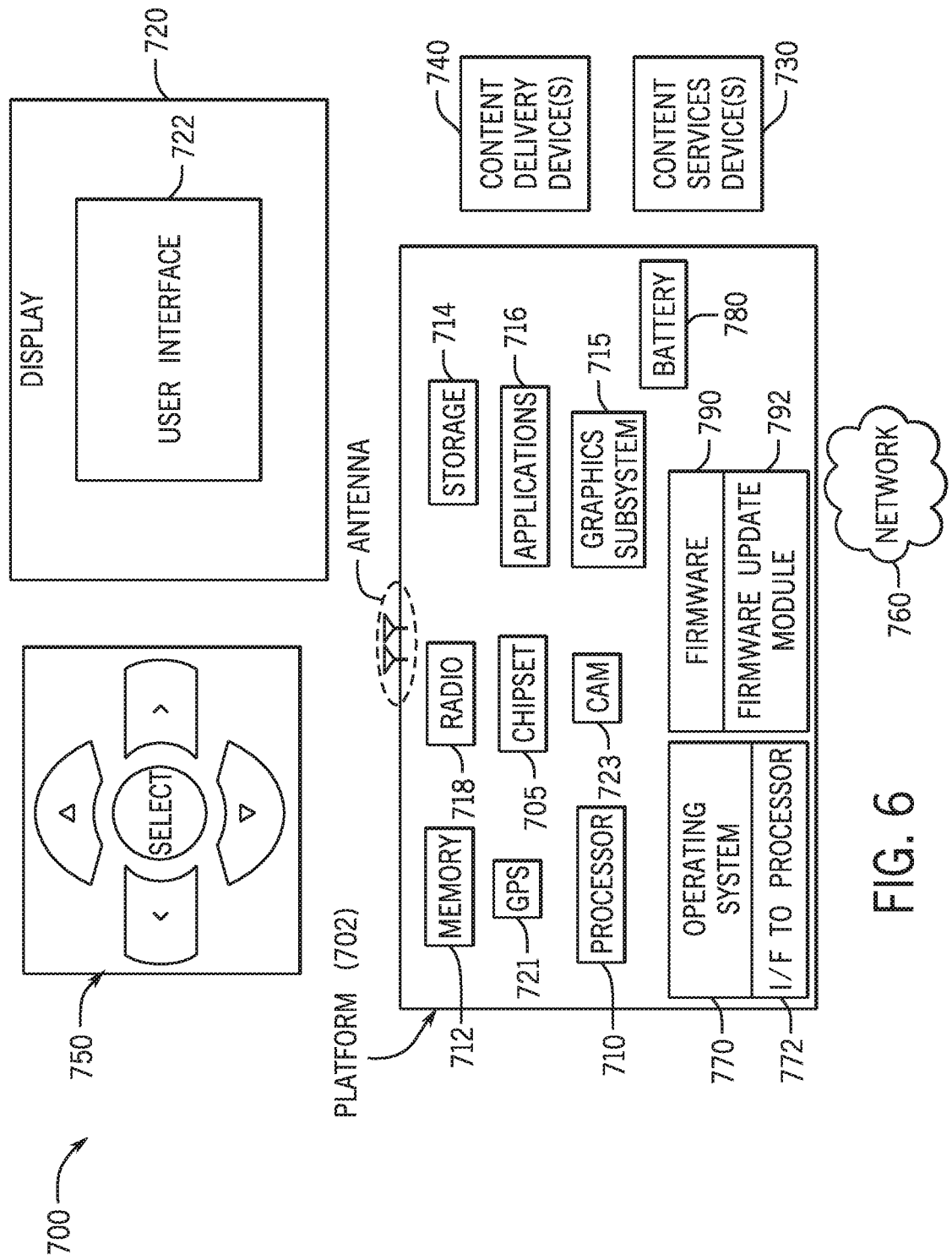
FIG. 6 is a system depiction for one embodiment.

FIG. 6 illustrates an embodiment of a system 700. In embodiments, system 700 may be a transmitter although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 1, 3 and 5 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
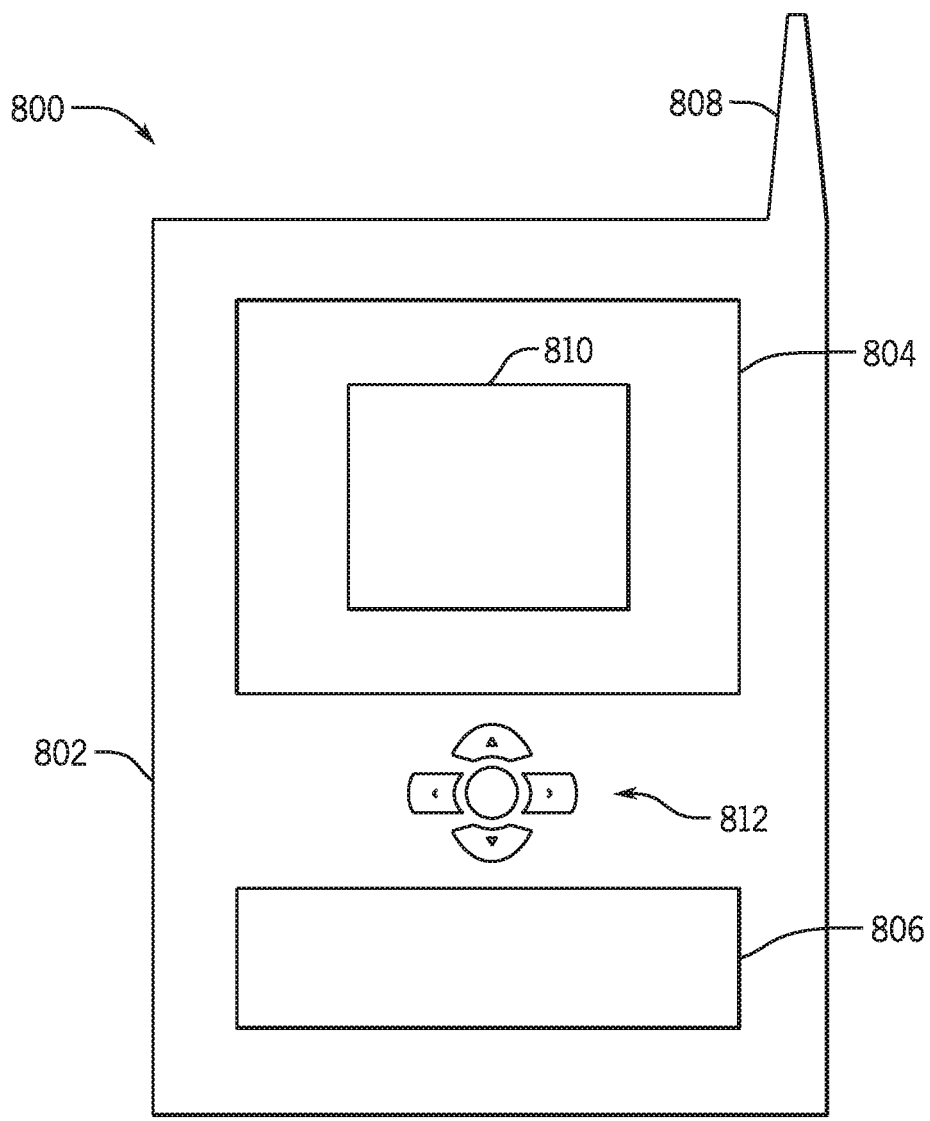
FIG. 7 is front elevation of a system according to one embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As shown in FIG. 7, device 800 may comprise a housing 802, a display 804 and 810, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

The following clauses and/or examples pertain to further embodiments;

One example embodiment may be a method of detecting a vehicle from a sequence of input images comprising applying a boosting detector to determine the presence of a vehicle in a picture, if the boosting detector is busy, identifying an initial bounding box around a candidate vehicle to be detected, wherein the bounding box encompasses less than the entire picture, and applying a tracking algorithm to the bounding box. The method may include wherein applying a tracking algorithm includes applying the boosting detector to the bounding box that was found in previous frame, selecting key points that correlate to predetermined features of a vehicle; and calculating an optical flow in the key points to find a shift of the bounding box and scale of the bounding box in current frame. The method may also include comparing the bounding box identified with higher confidence as containing a vehicle with results of the boosting detector that have lower confidence, and if the bounding box does not intersect any result of the boosting detector, rejecting the bounding box as failing to detect a vehicle. The method may also include running the detector in one thread and running the tracker in a different thread. The method may also include updating the initial bounding box based on the optical flow between sequential images. The method may also include initializing the optical flow using a points selection algorithm. The method may also include determining average displacement of the points to determine a tracked, updated bounding box. The method may also include for each pair of points determining a ratio between distances calculated between image points in a first frame and image points in the next frame. The method may also include selecting key points based on feature distribution in the bounding box. The method may also include detecting a tracking failure based on a ratio of intersection area of a lower confidence initial bounding box and tracked, updated bounding box to the area of the tracked, updated bounding box.

In another example embodiment may be at least one non-transitory computer readable media storing instructions to perform a sequence comprising applying a boosting detector to determine the presence of a vehicle in a picture, if the boosting detector is busy, identifying an initial bounding box around a candidate vehicle to be detected, wherein the bounding box encompasses less than the entire picture, and applying a tracking algorithm to the bounding box. The media may include said sequence including applying the boosting detector to the bounding box that was found in previous frame, selecting key points that correlate to predetermined features of a vehicle, and calculating an optical flow in the key points to find a shift of the bounding box and scale of the bounding box in current frame. The media may include said sequence including comparing the bounding box identified with higher confidence as containing a vehicle with results of the boosting detector that have lower confidence, and if the bounding box does not intersect any result of the boosting detector, rejecting the bounding box as failing to detect a vehicle. The media may include said sequence including running the detector in one thread and running the tracker in a different thread. The media may include said sequence including updating the initial bounding box based on the optical flow between sequential images. The media may include said sequence including initializing the optical flow using a points selection algorithm. The media may include said sequence including determining average displacement of the points to determine a tracked, updated bounding box. The media may include said sequence including for each pair of points determining a ratio between distances calculated between image points in a first frame and image points in the next frame. The media may include said sequence including selecting key points based on feature distribution in the bounding box. The media may include said sequence including detecting a tracking failure based on a ratio of intersection area of a lower confidence initial bounding box and tracked, updated bounding box to the area of the tracked, updated bounding box.

In another example embodiment may be an apparatus comprising a processor to apply a boosting detector to determine the presence of a vehicle in a picture, if the boosting detector is busy, identify an initial bounding box around a candidate vehicle to be detected, wherein the bounding box encompasses less than the entire picture, apply a tracking algorithm to the bounding box, and a memory coupled to said processor. The apparatus may include said processor to apply a tracking algorithm by applying the boosting detector to the bounding box that was found in previous frame, selecting key points that correlate to predetermined features of a vehicle, and calculating an optical flow in the key points to find a shift of the bounding box and scale of the bounding box in current frame. The apparatus may include said processor to compare the bounding box identified with higher confidence as containing a vehicle with results of the boosting detector that have lower confidence; and if the bounding box does not intersect any result of the boosting detector, reject the bounding box as failing to detect a vehicle. The apparatus may include said processor to run the detector in one thread and running the tracker in a different thread. The apparatus may include said processor to update the initial bounding box based on the optical flow between sequential images. The apparatus may include said processor to initialize the optical flow using a points selection algorithm. The apparatus may include said processor to determine average displacement of the points to determine a tracked, updated bounding box. The apparatus may include said processor to determine for each pair of points, a ratio between distances calculated between image points in a first frame and image points in the next frame. The apparatus may include said processor to select key points based on feature distribution in the bounding box. The apparatus may include said processor to detect a tracking failure based on a ratio of intersection area of a lower confidence initial bounding box and tracked, updated bounding box to the area of the tracked, updated bounding box.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method of detecting a vehicle from a sequence of input images comprising:
   detecting, using a main detector, the vehicle in a first input image of the sequence of input images;
   identifying a small area in a second input image of the sequence of input images, wherein the identified small area encompasses a sub-portion of the second input image and surrounds a previously detected bounding box of the vehicle;
   applying a small area detector to the identified small area, the small area detector to generate a low confidence detection of the vehicle or a high confidence detection of the vehicle;
   determining whether an output of the small area detector includes the high confidence detection of the vehicle;
   in response to a determination that the output of the small area detector does not include the high confidence detection of the vehicle, applying the low confidence detection to a tracking algorithm to estimate an updated position of the vehicle; and
   in response to a determination that the output of the small area detector includes the high confidence detection of the vehicle, generating an updated bounding box of the vehicle as a corrected position of the vehicle.

2. The method of claim 1 wherein applying the tracking algorithm includes:
   selecting key points that correlate to predetermined features of the vehicle; and
   calculating an optical flow in the key points to find a shift of the previously detected bounding box and scale of the previously detected bounding box.

3. The method of claim 2 including:
   determining whether a result of the optical flow in the key points is verified by the low confidence detection provided by the small area detector;
   in response to a determination that the result of the optical flow in the key points is verified by the low confidence detection, updating a position of the previously detected bounding box based on the result of the optical flow; and
   in response to a determination that the result of the optical flow in the key points is not verified by the low confidence detection, discarding the result of the optical flow.

4. The method of claim 2 including initializing the optical flow using a points selection algorithm.

5. The method of claim 4 including determining average displacement of the key points to determine a tracked, updated bounding box.

6. The method of claim 5 including determining a ratio between distances calculated between key points in the first input frame and key points in a second input frame.

7. The method of claim 5 including selecting the key points based on feature distribution in the bounding box.

8. The method of claim 7, wherein the feature distribution is provided by the small area detector.

9. A non-transitory computer readable medium storing instructions to perform a sequence comprising:
   detecting, using a main detector, a vehicle in a first input image of a sequence of input images;
   identifying a small area in a second input image of the sequence of input images, wherein the identified small area encompasses a sub-portion of the second input image and surrounds a previously detected bounding box of the vehicle;
   applying a small area detector to the identified small area, the small area detector to generate a low confidence detection of the vehicle or a high confidence detection of the vehicle; determining whether an output of the small area detector includes the high confidence detection of the vehicle;
   in response to a determination that the output of the small area detector does not include the high confidence detection of the vehicle, applying the low confidence detection to a tracking algorithm to estimate an updated position of the vehicle; and in response to a determination that the output of the small area detector includes the high confidence detection of the vehicle, generating an updated bounding box of the vehicle as a corrected position of the vehicle.

10. The medium of claim 9, further storing instructions to perform a sequence wherein applying the tracking algorithm includes:
   selecting key points that correlate to predetermined features of the vehicle; and
   calculating an optical flow in the key points to find a shift of the previously detected bounding box and scale of the previously detected bounding box.

11. The medium of claim 10, further storing instructions to perform a sequence including:
   determining whether a result of the optical flow in the key points is verified by the low confidence detection provided by the small area detector;
   in response to a determination that the result of the optical flow in the key points is verified by the low confidence detection, updating a position of the previously detected bounding box based on the result of the optical flow; and
   in response to a determination that the result of the optical flow in the key points is not verified by the low confidence detection, discarding the result of the optical flow.

12. The medium of claim 10, further storing instructions to perform a sequence including initializing the optical flow using a points selection algorithm.

13. The medium of claim 12, further storing instructions to perform a sequence including determining average displacement of the key points to determine a tracked, updated bounding box.

14. The medium of claim 13, further storing instructions to perform a sequence including determining a ratio between distances calculated between key points in the first input frame and key points in a second input frame.

15. The medium of claim 13, further storing instructions to perform a sequence including selecting key points based on feature distribution in the bounding box.

16. The medium of claim 15, wherein the feature distribution is provided by the small area detector.

17. An apparatus comprising:
   a processor to:
      detect, using a main detector, a vehicle in a first input image of a sequence of input images,
      identify a small area in a second input image of the sequence of input images, wherein the identified small area encompasses a sub-portion of the second input image and surrounds a previously detected bounding box of the vehicle,
      apply a small area detector to the identified small area, the small area detector to generate a low confidence detection of the vehicle or a high confidence detection of the vehicle,
      determine whether an output of the small area detector includes the high confidence detection of the vehicle,
      in response to a determination that the output of the small area detector does not include the high confidence detection of the vehicle, apply the low confidence detection to a tracking algorithm to estimate an updated position of the vehicle, and
      in response to a determination that the output of the small area detector includes the high confidence detection of the vehicle, generate an updated bounding box of the vehicle as a corrected position of the vehicle; and
   a memory coupled to said processor.

18. The apparatus of claim 17, said processor to:
   select key points that correlate to predetermined features of the vehicle, and
   calculate an optical flow in the key points to find a shift of the previously detected bounding box and scale of the previously detected bounding box in the first input image.

19. The apparatus of claim 18, said processor to:
   in response to a determination that the result of the optical flow in the key points is verified by the low confidence detection provided by the small area detector, update a position of the previously detected bounding box based on the result of the optical flow; and
   in response to a determination that the result of the optical flow in the key points is not verified by the low confidence detection, discard the result of the optical flow.

20. The apparatus of claim 18, said processor to initialize the optical flow using a points selection algorithm.

21. The apparatus of claim 20, said processor to determine average displacement of the key points to determine a tracked, updated bounding box.

22. The apparatus of claim 21, said processor to determine a ratio between distances calculated between key points in the first input frame and key points in a second input frame.

23. The apparatus of claim 21, said processor to select key points based on feature distribution in the bounding box.

24. The apparatus of claim 23, wherein the feature distribution is provided by the small area detector.

* * * * *